(12) United States Patent
Gebhardt et al.

(10) Patent No.: US 11,898,344 B2
(45) Date of Patent: Feb. 13, 2024

(54) EXPANSION JOINT HAVING COVER PAN WITH MAGNETIC ATTACHMENT

(71) Applicant: InPro Corporation, Muskego, WI (US)

(72) Inventors: David R. Gebhardt, Milwaukee, WI (US); George Matthew Fisher, New Berlin, WI (US)

(73) Assignee: InPro Corporation, Muskego, WI (US)

( * ) Notice: Subject to any disclaimer, the term of this patent is extended or adjusted under 35 U.S.C. 154(b) by 92 days.

(21) Appl. No.: 17/730,838

(22) Filed: Apr. 27, 2022

(65) Prior Publication Data

US 2023/0349150 A1 Nov. 2, 2023

(51) Int. Cl.
*E04B 1/68* (2006.01)
*E04B 1/61* (2006.01)
*E04F 13/08* (2006.01)

(52) U.S. Cl.
CPC .............. *E04B 1/6804* (2013.01); *E04B 1/61* (2013.01); *E04B 1/681* (2013.01); *E04B 1/6803* (2013.01); *E04F 13/0883* (2013.01)

(58) Field of Classification Search
CPC . E04B 1/61; E04B 1/40; E04B 1/6803; E04B 1/681; E04B 1/6804; E04F 19/0472; E04F 13/0883
USPC ................................................ 52/393–402
See application file for complete search history.

(56) References Cited

U.S. PATENT DOCUMENTS

| | | | |
|---|---|---|---|
| 3,729,889 A * | 5/1973 | Baruzzini | F25D 23/063 |
| | | | D25/1 |
| 5,078,529 A | 1/1992 | Moulton | |
| 5,611,181 A | 3/1997 | Shreiner et al. | |
| 5,666,775 A | 9/1997 | Shreiner et al. | |
| 5,799,456 A | 9/1998 | Shreiner et al. | |
| 6,430,884 B1 | 8/2002 | Shreiner et al. | |
| 9,140,017 B1 * | 9/2015 | Oliver | E04F 13/081 |
| 9,279,248 B2 * | 3/2016 | Bradford | E04B 1/6803 |

(Continued)

FOREIGN PATENT DOCUMENTS

KR 101267325 5/2013

OTHER PUBLICATIONS

International Searching Authority, "International Search Report and Written Opinion," issued in connection with International Patent Application No. PCT/US2019/044808, dated Nov. 15, 2019, 13 pages.

(Continued)

*Primary Examiner* — Brent W Herring
(74) *Attorney, Agent, or Firm* — Reinhart Boerner Van Deuren s.c.

(57) ABSTRACT

Embodiments of an expansion joint are provided. The expansion joint is configured to cover a gap between a first architectural surface and a second architectural surface. The expansion joint includes a panel having a first surface and a second surface in which the second surface is opposite the first surface. When the panel covers the gap, the panel is magnetically connected to both of the first architectural surface or the second architectural surface. In specific embodiments, at least one of the magnetic structures that magnetically connect the panel to both of the first architectural surface or the second architectural surface is allowed to move in response to movement of the panel. In more specific embodiments, the movement of the magnetic structure is a tilting movement.

11 Claims, 9 Drawing Sheets

(56) References Cited

U.S. PATENT DOCUMENTS

| | | |
|---|---|---|
| 10,858,826 B2 | 12/2020 | Gebhardt et al. |
| 2005/0162249 A1 | 7/2005 | Simola |
| 2011/0083383 A1 | 4/2011 | Hilburn, Jr. |
| 2013/0111840 A1* | 5/2013 | Bordener .................. E04B 1/68 52/393 |
| 2015/0113745 A1 | 4/2015 | Haydu |

OTHER PUBLICATIONS

InPro Corporation, "Custom 353 System with Cable," Drawing, 1 page.
InPro Corporation, "Custom 353 System," Drawing, 1 page.

* cited by examiner

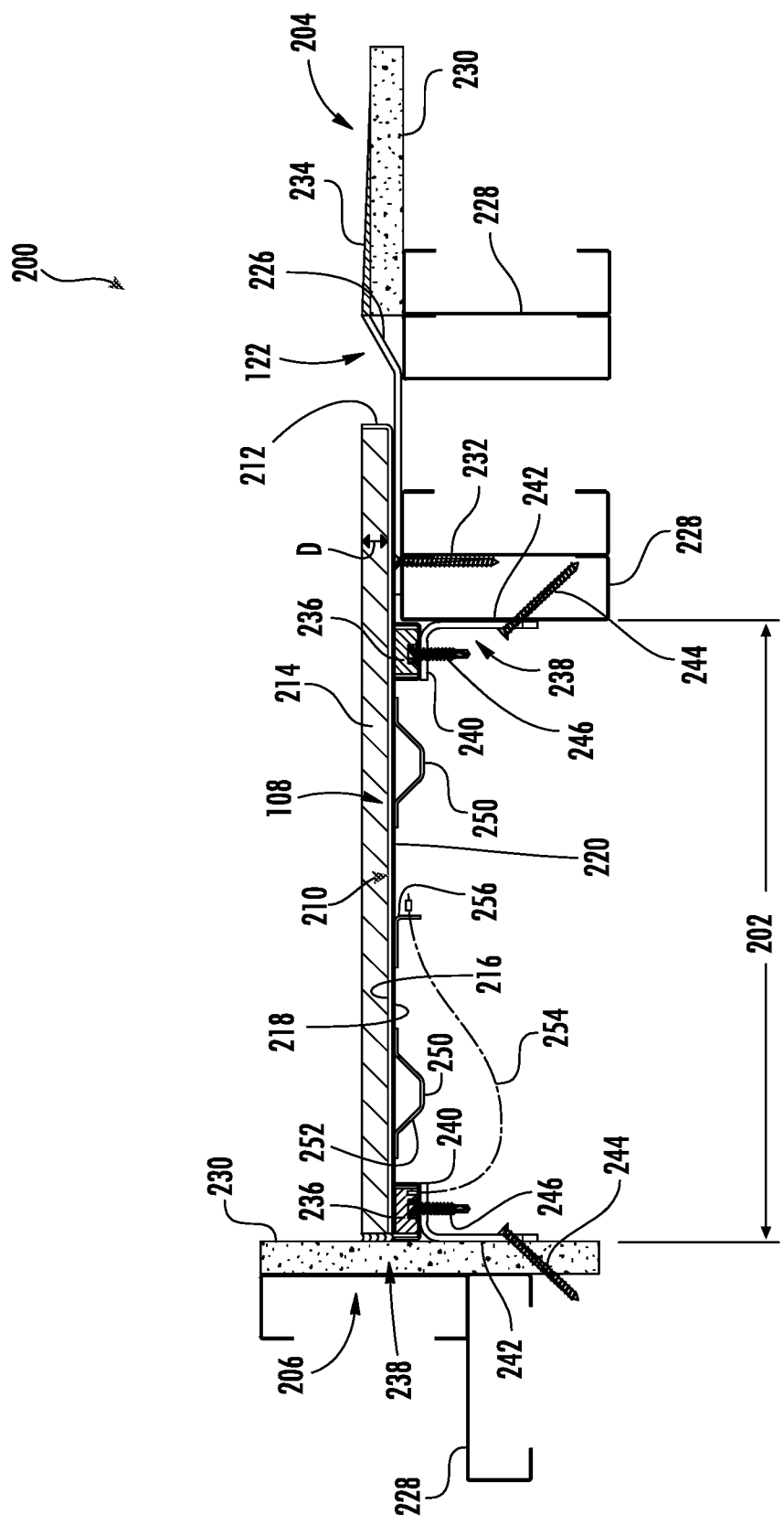

EXPANSION JOINT HAVING COVER PAN WITH MAGNETIC ATTACHMENT

BACKGROUND OF THE INVENTION

The present invention relates generally to the field of architectural joints. The present invention relates specifically to an expansion joint having a cover with a magnetic attachment. The expansion joint is configured to cover a gap between wall, ceiling, and/or floor sections in a building.

In a building, gaps are provided between sections of walls, ceilings, and/or floors to compensate for the expansion and contraction of a building as a result of temperature, seismic activity, sway from the wind, and deflection resulting from static or live loads. Such gaps are generally covered using expansion joints for both safety and aesthetic reasons. Embodiments of the present invention relate to expansion joints.

SUMMARY OF THE INVENTION

One embodiment of the invention relates to an expansion joint configured to span a gap having a width between a first architectural surface and a second architectural surface. The expansion joint includes a panel that is sized to span the gap. The panel has a first surface and a second surface, and the second surface is opposite to the first surface. The expansion joint also includes a first bracket that is configured to couple to both the first architectural surface and to the second surface of the panel, and a second bracket that is configured to couple both to the second architectural surface and to the second surface of the panel. Further, the expansion joint includes a first magnetic assembly. The first magnetic assembly includes a first magnetic structure coupled to the first bracket and magnetically coupled to the second surface of the panel. A first resilient structure is positioned at least in part between the first magnetic structure and the first bracket such that, when the first bracket is coupled to the first architectural surface and the second bracket is coupled to the second architectural surface, the first resilient structure allows movement of the first magnetic structure in response to movement of the panel caused by a change in the width between the first architectural surface and the second architectural surface.

Another embodiment of the invention relates to an expansion joint that is configured to span a gap having a width between a first architectural surface and a second architectural surface. The expansion joint includes a panel that is sized to span the gap. The panel has a first surface and a second surface. The second surface is opposite the first surface and is coupled both to the first architectural surface and to the second architectural surface. A magnetic strike plate is coupled to the second surface of the panel. The expansion joint also includes a first bracket that has a first bracket portion and a second bracket portion. The second bracket portion is configured to couple to the first architectural surface. A first resilient structure is coupled to the first bracket portion. Further, a first magnetic structure is coupled to the first resilient structure. The first magnetic structure is magnetically coupled to the magnetic strike plate, and movement of the panel causes movement of the first magnetic structure that deforms at least a portion of the first resilient structure.

Yet another embodiment relates to an expansion joint configured to span a gap having a width between a first architectural surface and a second architectural surface. The expansion joint includes a panel having a first end and a second end defining a planar section therebetween. The planar section has a first surface and a second surface, and the second surface is opposite the first surface. A magnetic strike plate is configured to couple to the second surface of the planar section. The expansion joint also includes a first bracket and a second bracket. The first bracket has a first bracket portion and a second bracket portion that is perpendicular to the first bracket portion. The second bracket portion is coupled to the first architectural surface. The second bracket has a third bracket portion and a fourth bracket portion that is perpendicular to the third bracket portion. The fourth bracket portion is configured to couple to the second architectural surface. Additionally, the expansion joint includes a first magnetic assembly and a second magnetic assembly. The first magnetic assembly includes a first magnetic structure that is magnetically coupled to the magnetic strike plate. The first magnetic structure has a generally cylindrical shape and includes a first plurality of magnets. A first rubber gasket is positioned at least in part between the first magnetic structure and the first bracket portion, and a first fastener couples the first magnetic structure, the first rubber gasket, and the first bracket portion together. The second magnetic assembly includes a second magnetic structure that is magnetically coupled to the magnetic strike plate. The second magnetic structure has a generally cylindrical shape and includes a second plurality of magnets. A second rubber gasket is positioned at least in part between the second magnetic structure and the third bracket portion, and a second fastener couples the second magnetic structure, the second rubber gasket, and the third bracket portion together. When the panel moves in response to a change in the width between the first architectural surface and the second architectural surface, the first rubber gasket allows the first magnetic structure to tilt in response to the movement of the panel without decoupling from the magnetic strike plate and the second rubber gasket allows the second magnetic structure to tilt in response to the movement of the panel without decoupling from the magnetic strike plate.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which:

FIG. 3 depicts a cross section of a second exemplary embodiment of an expansion joint;

DETAILED DESCRIPTION

Before turning to the figures, which illustrate the exemplary embodiments in detail, it should be understood that the present invention is not limited to the details or methodology set forth in the description or illustrated in the figures. It should also be understood that the terminology is for the purpose of description only and should not be regarded as limiting.

Generally, various embodiments of an expansion joint are provided. In particular, the expansion joint utilizes magnet elements to secure a panel over a gap between sections of a ceiling, a floor, and/or a wall. The panel also includes a tether to keep the panel from becoming completely dislodged from the ceiling, floor, and/or wall sections in response to seismic activity and/or other large expansions or contractions between architectural gaps.

Figure 1:
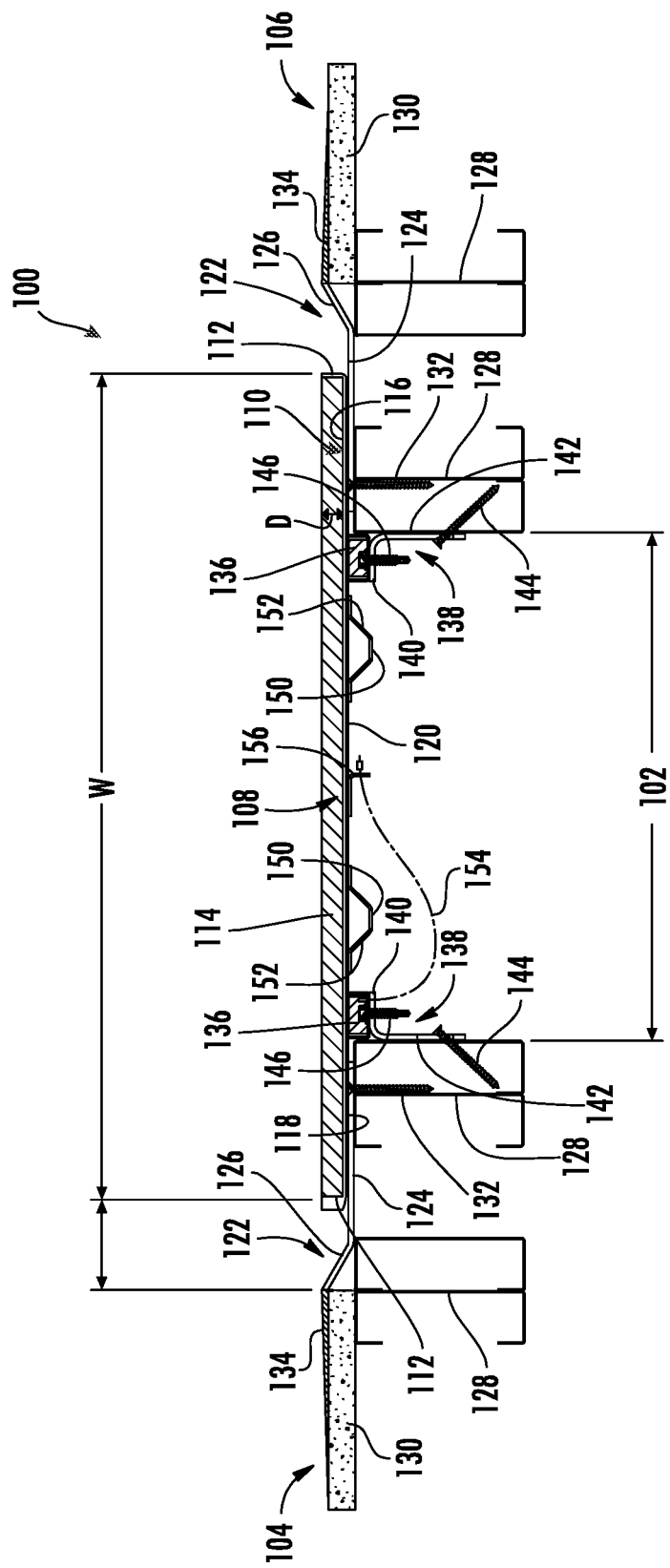
FIG. 1 depicts a cross-section of a first exemplary embodiment of an expansion joint.

Referring to FIG. 1, a first embodiment of an expansion joint 100 is depicted. In the depicted embodiment, the expansion joint 100 covers a gap 102 between a first wall section 104 and a second wall section 106. However, in other embodiments, the expansion joint 100 could instead cover a gap between sections of floor or ceiling, a gap between a section of wall and a second of floor, or a gap between a section of wall and a section of ceiling. When referred to generally, such wall, floor, or ceiling sections will be termed "architectural surfaces." A cross section of the expansion joint 100 is depicted in FIG. 1, which illustrates the width component of the expansion joint 100 that covers the width of the gap 102 between architectural surfaces and which illustrates the attachment of the expansion joint 100 to the architectural surfaces. Applicant notes that there is a length component to the expansion joint 100 that spans all or a substantial portion of the length of the gap 102, especially a substantial portion of the gap 102 that would otherwise be visible to an occupant of the building.

As shown in FIG. 1, the expansion joint 100 includes a panel 107 depicted as a cover pan 108 having a planar bottom section 110 and two side sections 112 arranged perpendicularly to the bottom section 110. The bottom section 110 and side sections 112 define a volume within the cover pan 108. Further, the side sections 112 define a depth D of the cover pan 108, which in various embodiments is from 5 mm to 100 mm, from 10 mm to 50 mm, or from 15 mm to 25 mm. Disposed within the depth D of the cover pan 108 is pan infill 114. The pan infill 114 may be a decorative feature to match or complement the interior design of the building in which the expansion joint 100 is installed. For instance, if the expansion joint 100 were used between wall sections 104, 106, the pan infill 114 may be paneling matching or complementing the pattern, color, and/or texture of the paneling on the wall sections 104, 106. In this way, the expansion joint 100 is less visible to casual observers. The pan infill 114 can be attached to or formed in the cover pan 108 in a variety of suitable ways, such as adhesives (e.g., tape), bonding agents (e.g., glues or epoxies), hook and loop fastener, painting, particle deposition (e.g., powder coating), etc. Additionally, while the panel 107 is depicted in FIG. 1 as being a cover pan 108 and a pan infill 114 joined to the cover pan 108, the panel 107 in other embodiments may instead be a composite of various face materials, core materials, and/or backing materials. Further, in other embodiments still, the panel 107 may be a single integral piece, instead of multiple pieces (e.g., cover pan 108 and pan infill 114) joined together.

The bottom section 110 of the cover pan 108 has a first surface 116 upon which the pan infill 114 is disposed and a second surface 118 that is opposite to the first surface 116. In specific embodiments, disposed on the second surface 118 is a magnetic strike plate 120. The magnetic strike plate 120 can be joined to the second surface 118 of the cover pan 108 in a variety of ways, including welding (e.g., spot welding), bonding with an adhesive, fasteners (e.g., screws, rivets, pins, etc.), or mechanical interfaces (such as sliding the magnetic strike plate 120 into a slot formed on or into the second surface 118), among others. As will discussed more fully below, the magnetic strike plate 120 allows for the cover pan 108 to remain in place over the gap 102 while still allowing the cover pan 108 to slide between the first wall section 104 and the second wall section 106 during expansion and contraction of the gap 102. In certain embodiments, a separate magnetic strike plate 120 is not provided, and instead, the second surface 118 of the cover pan 108 acts as a magnetic strike plate. That is, in such embodiments, at least the second surface 118 of the cover pan 108 is able to be attracted by a magnet. Further, in specific embodiments, the strike plate 120 is not continuous across the width of the panel 107. For example, in certain specific embodiments, the strike plate 120 comprises two plates with standard set widths of 50% or less than the width of the panel 107. Further, in other specific embodiments, the strike plates 120 are not symmetrically arranged. For example, the strike plates 120 may have variable spacing along the second surface 118 of the panel 107, and in embodiments in which the strike plates 120 are not continuous across the width of the panel 107, the strike plates 120 on either side of the panel 107 may be vertically offset from each other.

In specific embodiments, the cover pan 108 is seated within a depression define by wing plates 122. Each wing plate 122 includes a first section 124 and a second section 126. The first section 124 is substantially parallel to the plane defined by the first wall section 104 and the second wall section 106. The second section 126 is angled relative to the first section 124. In the embodiment depicted, the second section 126 is at an obtuse angle relative to the first section 124. In embodiments, the second section 126 is at an angle of 120° to 150° relative to the first section 124. In certain embodiments, the wing plate 122 is bendable at the vertex between the first section 124 and the second section 126 so that the angle the second section 126 forms with the first section 124 is adjustable. As shown in FIG. 1, the first wall section 104 and the second wall section 106 are each comprised of one or more wall studs 128 and a covering panel 130. In embodiments, the wall studs 128 are made of wood or metal. In embodiments, the covering panel 130 is one or more of drywall, slats, veneers, composite panels, cladding, etc. The first section 124 of each wing plate 122 contacts at least one wall stud 128. As depicted in FIG. 1, each wing plate 122 is in contact with two wall studs 128 and is attached to one wall stud 128. In particular, each wing plate 122 is connected to at least one wall stud 128 via a fastener 132. The second section 126 of each wing plate 122 is angled such that it has an end flush with or extending slightly past the covering panel 130. In embodiments, a feathering compound 134 is applied to smooth the transition between the covering panel 130 and the second section 126 of each wing plate 122.

The cover pan 108 is configured to float over wing plates 122 and between the wall sections 104, 106 so that the cover pan 108 continues to hide the gap 102 during expansion and contraction of the gap 102. In order to allow this floating, the cover pan 108 is magnetically connected to the first wall section 104 and the second wall section 106 via at least one magnetic assembly, depicted schematically in FIGS. 1-4 as a magnetic block 136. In various specific embodiments, the magnetic assembly includes a generally rectangular magnetic structure. In some specific embodiments, the magnetic structure includes a single magnet. As will be described in greater detail below, in certain specific embodiments, the magnetic assembly includes a generally cylindrical magnetic structure and an array of magnets (see, e.g., FIG. 5).

In specific embodiments, magnetic blocks 136 are coupled to brackets 138 that are each secured to a respective wall section 104, 106. In particular, each bracket 138 has a first bracket portion 140 to which the magnetic block 136 is mounted and a second bracket portion 142 that is arranged perpendicularly to the first bracket portion 140. The second bracket portion 142 of each bracket 138 is connected to a respective wall section 104, 106 via at least one fastener 144.

The magnetic blocks 136 may be attached to the first bracket portion 140 using fasteners 146, adhesives or bonding agents or by relying on magnetic attraction between the magnetic block 136 and the first bracket portion 140 (if made of a magnetic material). In embodiments, each bracket 138 may be one continuous bracket spanning the length of the cover pan 108, or each bracket 138 may be a plurality of brackets that span the length of the cover pan 108 at regular or irregular intervals.

In specific embodiments, each magnetic structure has a magnetic flux density of at least 0.5 kilogauss (kG). In other embodiments, each magnetic structure has a magnetic flux density of at least 1.0 kG. In still other embodiments, each magnetic structure has a magnetic flux density of at least 1.5 kG. Alternatively or additionally, in specific embodiments, each magnetic structure is configured to hold at least 10 lbs. In other specific embodiments, each magnetic structure is configured to hold at least 60 lbs. In still other embodiments, each magnetic structure is configured to hold at least 90 lbs. Exemplary magnet materials that may be used for the magnetic structures include ferrite magnets, rare earth magnets, ceramic magnets, and/or aluminum-nickel-cobalt (alnico) magnets.

The magnetic strike plate 120 is attracted to the magnetic blocks 136 to maintain the cover pan 108 over gap 102. In this way, as the gap 102 expands and contracts from, e.g., thermal fluctuations or seismic activity, the cover pan 108 will continue to conceal the gap 102. In some instances, though, the thermal expansion/contraction or seismic activity may be so great as to overcome the magnetic attraction between the magnetic blocks 136 and the magnetic strike plate 120 such that the cover pan 108 becomes dislodged. Indeed, in certain instances, it is desirable that the cover pan 108 become dislodged so as to prevent damage to the cover pan 108. In order to encourage the cover pan 108 to become dislodged when the gap 102 closes to a particular distance, the cover pan 108 includes pop-up brackets 150 mounted to the second surface 118. As can be seen in FIG. 1, the cover pan 108 includes two pop-up brackets 150, and each pop-up bracket 150 includes an angled surface 152 facing a respective wall section 104, 106. As the gap 102 between the wall sections 104, 106 closes, the magnetic blocks 136 or the brackets 138 will contact the angled surfaces 152 of the pop-up brackets 150, pushing the cover pan 108 outwardly away from the wall sections 104, 106. A set of pop-up brackets 150 or a single pop-up bracket 150 may be provided at one or both longitudinal ends of the cover pan 108 and/or at various intermediary points. While in some circumstances it is desirable for the cover pan 108 to become dislodged, it is also preferable that the expansion joint 100 not break entirely free of the wall sections 104, 106. Thus, the expansion joint 100 includes at least one tether 154 connecting the cover pan 108 to at least one of the brackets 138.

As shown in FIG. 1, the tether 154 is connected, at one end, to the first bracket portion 140 of the bracket 138 on the first wall section 104. At the other end, the tether 154 is connected to the cover pan 108 via a cover pan bracket 156 mounted to the magnetic strike plate 120 or the second surface 118 of the cover pan 108. In embodiments, each end of the tether 154 is inserted through a respective aperture in the first bracket portion 140 and the cover pan bracket 156 and then crimped with a crimping nut to prevent the end of the tether 154 from pulling back through the aperture. However, in other embodiments, the tether 154 may be connected to the cover pan 108 and bracket 138 using other means. In embodiments, the tether 154 may be, e.g., a coated or uncoated metal cable, cord made from natural or synthetic yarns, chain-link cable, wire, etc. The length of the tether 154 in embodiments is from 100 mm to 1000 mm. Further, in embodiments, a plurality of tethers 154 is placed along the length of the cover pan 108 at regular or irregular intervals.

Figures 2A, 2B:
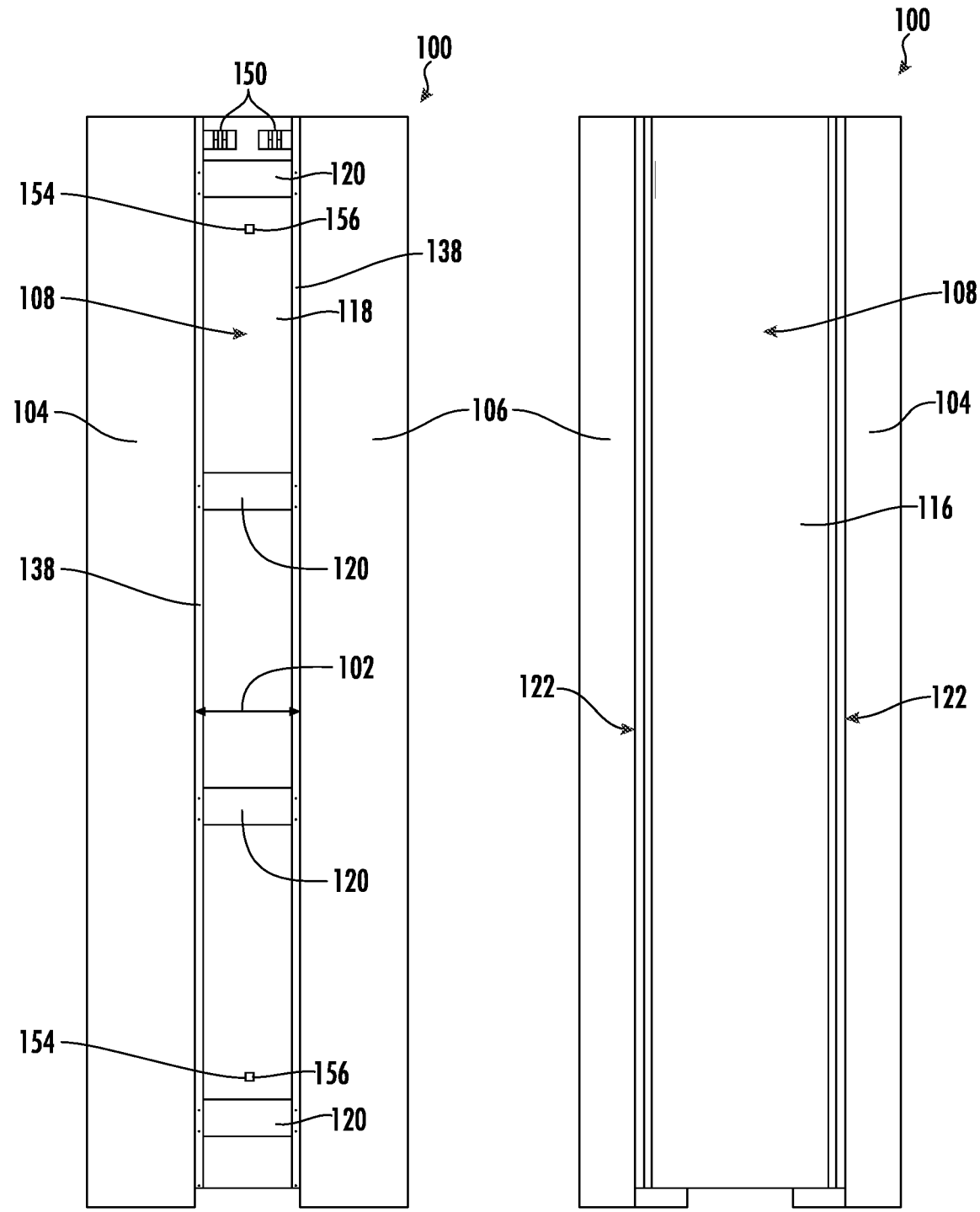
FIG. 2A depicts a rear view of the expansion joint of FIG. 1, according to an exemplary embodiment.
FIG. 2B depicts a front view of the expansion joint of FIG. 1, according to an exemplary embodiment.

FIGS. 2A and 2B depict longitudinal views of the expansion joint 100 between wall sections 104, 106. As can be seen in the rear view of the expansion joint 100 in FIG. 2A, the panel (depicted as cover pan 108) is in place over the gap 102. For this length of the wall sections 104, 106, the cover pan 108 has been provided with four magnetic strike plates 120 that are magnetically attracted to the magnetic assemblies (not shown in FIGS. 2A and 2B) on the brackets 138. Further, the cover pan 108 has been provided with two tethers 154. A first 154 is placed proximal to the top of the cover pan 108 and a second tether 154 is placed proximal to the bottom of the cover pan 108. The tethers 154 are slackened because the cover pan 108 is held in place by the magnetic attraction. In the event that the cover pan 108 becomes dislodged, the tethers 154 allow the cover pan 108 to separate away from the wall sections 104, 106 without completely breaking free.

In the embodiment shown in FIGS. 2A and 2B, only one set of pop-up brackets 150 are provided at the top of the cover pan 108. Thus, upon contraction of the gap 102, the top of the cover pan 108 will break away from the wallsections 104, 106 first. As such, the cover pan 108, upon becoming dislodged may form an angle with the wall sections. In particular, the cover pan 108 may form an angle of 45° or less with the plane defined by the wall sections 104, 106. This can, in part, be influenced by selecting the tether 154 near the top of the cover pan 108 to be longer than the tether 154 at the bottom of the cover pan 108. In another embodiment, the tethers 154 only allow the cover pan 108 to open at an angle of 30° or less. In still another embodiment, the tethers 154 only allow the cover pan 108 to open at an angle of 15° or less.

With respect to FIG. 2B, it can be seen that the wing plates 122 extend the length of the cover pan 108. The wing plates 122 also help dislodge the cover pan 108 upon a large contraction in the size of the gap 102. As shown in FIG. 1, the second section 126 of each wing plate 122 is angled relative to the first section 124. Thus, as the gap 102 contracts, the cover pan 108 will begin to slide up the second sections 126 of the wing plates 122, pushing the cover pan 108 away from the wall sections 104, 106.

Figure 2C:
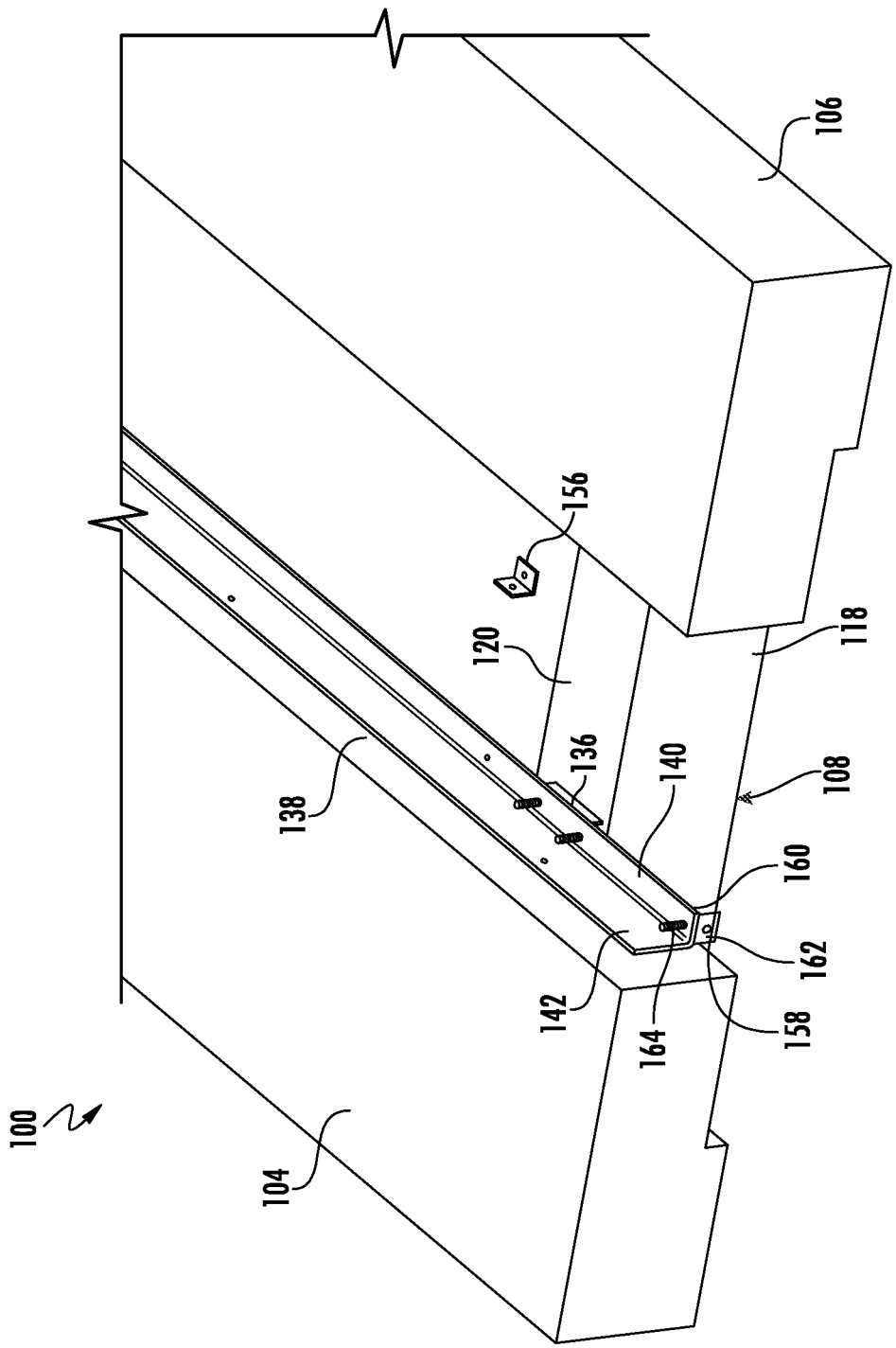
FIG. 2C depicts a rear view of a bottom portion of the expansion joint of FIG. 1, according to an exemplary embodiment.

Referring now to FIG. 2C, a rear view of the expansion joint 100 at the lower end of the cover pan 108 can be seen. In embodiments, an L-bracket 158 is attached to the bracket 138. In particular, the L-bracket 158 includes a first tab 160 and a second tab 162 arranged perpendicularly to each other. The first tab 160 is attached to the first portion 140 of the bracket 138 via a fastener 164. The cover pan 108 rests on second tab 162. In this way, the L-bracket 158 holds the cover pan 108 in its vertical position during expansion and contraction of the gap 102 so that the cover pan 108 does not slide downwardly along the wall sections 104, 106. While only one L-bracket 158 can be seen in FIG. 2C, the expansion joint 100 may include another L-bracket 158 connected to the other bracket 138 on the second wall section 106.

The expansion joint 100 as shown and described can be used between a variety of architectural surfaces to cover gaps 102 of a variety of different sizes. In embodiments, the gap 102 between the wall sections 104, 106 is from 75 mm to 300 mm and a width W of the cover pan 108 is from 275 mm to 500 mm. In other embodiments, the gap 102 between the wall sections 104, 106 is from 250 mm to 850 mm and the width W of the cover pan 108 is from 450 mm to 1050 mm. In still other embodiments, the gap 102 between the wall sections 104, 106 is from 800 mm to 1500 mm and the width W of the cover pan 108 is from 1000 mm to 1700 mm. In any of the previous embodiments, the cover pan 108 may be configured to cover the gap 102 as it expands and contracts from, e.g., 25% to 100% of the gap 102. In order to maintain the magnetic strike plate 120 in contact with the magnetic blocks 136, in embodiments, the magnetic strike plate 120 has a width that is at least 110% of the width of the gap 102. In other embodiments, the magnetic strike plate 120 has a width that is at least 120% of the width of the gap 102. In still further embodiments, the magnetic strike plate 120 has a width that is at least 130% of the width of the gap 102. In embodiments, the magnetic strike plate 120 has a width that is no more than the width of the cover pan 108. In embodiments, the magnetic strike plate 120 is continuous along the length of the cover pan 108, and in other embodiments, e.g., as shown in FIG. 2A, the magnetic strike plate 120 comprises a plurality of strike plates 120 spanning the length of the cover pan 108 at regular or irregular intervals.

The expansion joint 100 as described with respect to FIG. 1 is configured to cover a gap 102 between architectural surfaces for both aesthetic and safety reasons. Using magnetic attraction between the magnetic strike plate 120 and the magnetic assemblies (e.g., magnetic blocks 136) allows the cover pan 108 of the expansion joint 100 to float over the architectural surfaces. Additionally, using magnetic attraction also allows for easier uncovering of the gap 102 so that, e.g., maintenance personnel can access the space between the architectural surfaces to install or check the status of any fire barriers, water barriers, etc. contained therein.

With reference now to FIG. 3, another embodiment of an expansion joint 200 is provided. In the embodiment depicted in FIG. 3, the expansion joint 200 covers a gap 202 between a first wall section 204 that intersects a second wall section 206. As depicted, the first wall section 204 defines a first plane, and the second wall section 206 defines a second plane that is substantially perpendicular to the first plane. A cross section of the expansion joint 200 is depicted in FIG. 3, which illustrates the width component of the expansion joint 200 that covers the width of the gap 202 between architectural surfaces and which illustrates the attachment of the expansion joint 200 to the architectural surfaces. Similarly to the expansion joint 100 of FIG. 1, Applicant notes that there is a length component to the expansion joint 200 of FIG. 3 that spans all or a substantial portion of the length of the gap 202, especially a substantial portion of the gap 202 that is visible to an occupant of the building.

As shown in FIG. 3, the expansion joint 200 includes a panel 207 depicted as cover pan 208 having a planar bottom section 210 and two side sections 212 arranged perpendicularly to the bottom section 210. The bottom section 210 and side sections 212 define a volume within the cover pan 208. Further, the side sections 212 define a depth D of the cover pan 208, which in embodiments is from 5 mm to 100 mm, from 10 mm to 50 mm, or from 15 mm to 25 mm. Disposed within the depth D of the cover pan 208 is pan infill 214. The pan infill 214 may be a decorative feature to match the interior design of the building in which the expansion joint 200 is installed. For instance, if the expansion joint 200 were used between wall sections 204, 206, the pan infill 214 may be paneling matching or complementing the pattern, color, and/or texture of the paneling on the wall sections 204, 206. In this way, the expansion joint is less visible to casual observers. The pan infill 214 can be attached to or formed in the cover pan 208 in a variety of suitable ways, such as adhesives (e.g., tape), bonding agents (e.g., glues or epoxies), hook and loop fastener, painting, particle deposition (e.g., powder coating), etc. As described above, the panel 207 in embodiments may instead be a composite of various face materials, core materials, and/or backing materials. Further, in embodiments, the panel 207 may be a single integral piece, instead of multiple pieces (e.g., cover pan 208 and pan infill 214) joined together.

The bottom section 210 of the cover pan 208 has a first surface 216 upon which the pan infill 214 is disposed and a second surface 218 that is opposite to the first surface 216. In embodiments, a magnetic strike plate 220 is disposed on the second surface 218. The magnetic strike plate 220 can be joined to the second surface 218 of the cover pan 208 in a variety of ways, including welding (e.g., spot welding), bonding with an adhesive, fasteners (e.g., screws, rivets, pins, etc.), or mechanical interfaces (such as sliding the magnetic strike plate 220 into a slot formed on or into the second surface 218), among others. As will discussed more fully below, the magnetic strike plate 220 allows for the cover pan 208 to remain in place over the gap 202 while still allowing the cover pan 208 to slide over the first wall section 204 during expansion and contraction of the gap 202. In certain embodiments, a separate magnetic strike plate 220 is not provided, and instead, the second surface 218 of the cover pan 208 acts as a magnetic strike plate. That is, in such embodiments, at least the second surface 218 of the cover pan 208 is able to be attracted by a magnet. Further, in embodiments, the strike plate 220 is not continuous across the width of the panel 207. For example, in embodiments, the strike plate 220 comprises two plates with standard set widths of 50% or less than the width of the panel 207. Further, in embodiments, the strike plates 220 are not symmetrically arranged. For example, the strike plates 220 may have variable spacing along the second surface 218 of the panel 207, and in embodiments in which the strike plates 220 are not continuous across the width of the panel 207, the strike plates 220 on either side of the panel 207 may be vertically offset from each other.

In embodiments, the cover pan 208 is seated within a depression define by a wing plate 222. As compared to the previous embodiment, only one wing plate 222, which is secured to the first wall section 204 is used in the embodiment of FIG. 2. The second wall section 206 does not include a wing plate 222. As with the previous embodiment, the wing plate 222 helps dislodge the cover pan 208 upon a large contraction in the size of the gap 202. In this regard, the wing plate 222 includes a first section 224 and a second section 226. The first section 224 is substantially parallel to the plane defined by the first wall section 204. The second section 226 is angled relative to the first section 224. In the embodiment depicted, the second section 226 is at an obtuse angle relative to the first section 224. In embodiments, the second section 226 is at an angle of 120° to 150° relative to the first section 224. In certain embodiments, the wing plate 222 is bendable at the vertex between the first section 224 and the second section 226 so that the angle the second section 226 forms with the first section 224 is adjustable. As shown in FIG. 3, the first wall section 204 and the second wall section 206 are each comprised of one or more wall studs 228 and a covering panel 230. In embodiments, the wall studs 228 are made of wood or metal. In embodiments, the covering panel 230 is one or more of drywall, slats, veneers, composite panels, cladding, etc. The first section 224 of the wing plate 222 contacts at least one wall stud 228. As depicted in FIG. 3, the wing plate 222 is in contact with two wall studs 228 and is attached to one wall stud 228. In particular, the wing plate 222 is connected to at least one wall stud 228 via a fastener 232. The second section 226 of the wing plate 222 is angled such that it has an end flush with or extending slightly past the covering panel 230 of the first wall section 204. In embodiments, a feathering compound 234 is applied to smooth the transition between the covering panel 230 and the second section 226 of the wing plate 222.

The cover pan 208 is configured to float over the wing plate 222 located at a first end 208a of the cover pan 208 and on the first wall section 204. At a second end 208b of the cover pan 208, the cover pan 208 is proximal to or may abut the second wall section 206. In this way, the cover pan 208 is able to hide the gap 202 during expansion and contraction of the gap 202. As with the previous embodiment, the cover pan 208 is magnetically connected to the first wall section 204 and the second wall section 206 via at least one magnetic assembly, depicted as magnetic blocks 236, contained on brackets 238 secured to a respective wall section 204, 206. In particular, each bracket 238 has a first bracket portion 240 to which a magnetic block 236 is mounted and a second bracket portion 242 that is arranged perpendicularly to the first bracket portion 240. The second bracket portion 242 of each bracket 238 is connected to a respective wall section 204, 206 via at least one fastener 244. As can be seen in FIG. 3, the fastener 244 through the second bracket portion 242 of bracket 238 at the second end 208b of the cover pan 208 is driven through the covering panel 230 of the second wall section 206. The fastener 244 through the second bracket portion 242 of bracket 238 at the first end 208a of the cover pan 208 is instead driven into or through a wall stud 228 of the first wall section 204. FIG. 3 also depicts that the magnetic blocks 236 may be attached to each respective first bracket portion 240 using fasteners 246, adhesives or bonding agents or by relying on magnetic attraction between the magnetic block 236 and the first bracket portion 240 (if made of a magnetic material). In embodiments, each bracket 238 may be one continuous bracket spanning the length of the cover pan 208, or each bracket 238 may be a plurality of brackets that span the length of the cover pan 208 at regular or irregular intervals.

As described above, each of the magnetic structures may have a magnetic flux density of at least 0.5 kG, at least 1.0 kG, or at least 1.5 kG. Alternatively or additionally, in embodiments, each of the magnetic structures is configured to hold at least 10 lbs, at least 60 lbs, or at least 90 lbs. Each magnetic structure may be a ferrite magnet, rare earth magnet, ceramic magnet, and/or alnico magnet. The magnetic strike plate 220 (or the second surface 218 of the cover pan 208) is attracted to the magnetic structure to maintain the cover pan 208 over gap 202.

As with the previous embodiment, the cover pan 208 includes pop-up brackets 250 mounted to the second surface 218 that encourage the cover pan 208 to become dislodged when the gap 202 closes to a particular distance. As can be seen in FIG. 3, the cover pan 208 includes two pop-up brackets 250, and each pop-up bracket 250 includes an angled surface 252 facing a respective wall section 204, 206. As the gap 202 between the wall sections 204, 206 closes, the magnetic blocks 236 or brackets 238 will contact the angled surfaces 252 of the pop-up brackets 250, pushing the cover pan 208 outwardly away from the wall sections 204, 206. A set of pop-up brackets 250 or a single pop-up bracket 250 may be provided at one or both longitudinal ends of the cover pan 208 and/or at various intermediary points.

Also like the previous embodiment, the expansion joint 200 includes at least one tether 254 connecting the cover pan 208 to at least one of the brackets 238. The tether 254 is connected, at one end, to the first bracket portion 240 of the bracket 238 on the second wall section 206. At the other end, the tether 254 is connected to the cover pan 208 via a cover pan bracket 256 mounted to the magnetic strike plate 220 or the second surface 218 of the cover pan 208. In embodiments, each end of the tether 254 is inserted through a respective aperture in the first bracket portion 240 and the cover pan bracket 256 and then crimped with a crimping nut to prevent the end of the tether 254 from pulling back through the aperture. However, in other embodiments, the tether 254 may be connected to the cover pan 208 and bracket 238 using other means. In embodiments, the tether 254 may be, e.g., a coated or uncoated metal cable, cord made from natural or synthetic yarns, chain-link cable, wire, etc. The length of the tether 254 in embodiments is from 100 mm to 1000 mm. Further, in embodiments, a plurality of tethers 254 is placed along the length of the cover pan 208 at regular or irregular intervals. The tether 254 or tethers 254 may cause the cover pan 208, upon becoming dislodged, to form an angle with the first wall section 204. In particular, the cover pan 208 may form an angle of 45° or less, 30° or less, or 15° or less with the plane defined by the first wall section 204. This can, in part, be influenced by selecting the tether 254 near the top of the cover pan 208 to be longer than the tether 254 at the bottom of the cover pan 208.

The expansion joint 200 as shown and described can be used between a variety of architectural surfaces to cover gaps 202 of a variety of different sizes. In embodiments, the gap 202 between the wall sections 204, 206 is from 75 mm to 300 mm and a width W of the cover pan 208 is from 275 mm to 500 mm. In other embodiments, the gap 202 between the wall sections 204, 206 is from 250 mm to 850 mm and the width W of the cover pan 208 is from 450 mm to 1050 mm. In still other embodiments, the gap 202 between the wall sections 204, 206 is from 800 mm to 1500 mm and the width W of the cover pan 208 is from 1000 mm to 1700 mm. In any of the previous embodiments, the cover pan 208 may be configured to cover the gap 202 as it expands and contracts from, e.g., 25% to 100% of the gap 202. In order to maintain the magnetic strike plate 220 in contact with the magnetic blocks 236, in embodiments, the magnetic strike plate 220 has a width that is at least 110%, at least 120%, or at least 130% of the width of the gap 202. In embodiments, the magnetic strike plate 220 has a width that is no more than the width of the cover pan 208. In embodiments, the magnetic strike plate 220 is continuous along the length of the cover pan 208, and in other embodiments, the magnetic strike plate 220 comprises a plurality of strike plates 220 spanning the length of the cover pan 208 at regular or irregular intervals.

The expansion joint 200 as described with respect to FIG. 3 is configured to cover a gap 202 between architectural surfaces for both aesthetic and safety reasons. Using magnetic attraction between the magnetic strike plate 220 and the magnetic blocks 236 allows the cover pan 208 of the expansion joint 200 to float over the architectural surfaces. Additionally, using magnetic attraction also allows for easier uncovering of the gap 202 so that, e.g., maintenance personnel can access the space between the architectural surfaces to install or check the status of any fire barriers, water barriers, etc. contained therein.

Figure 4:
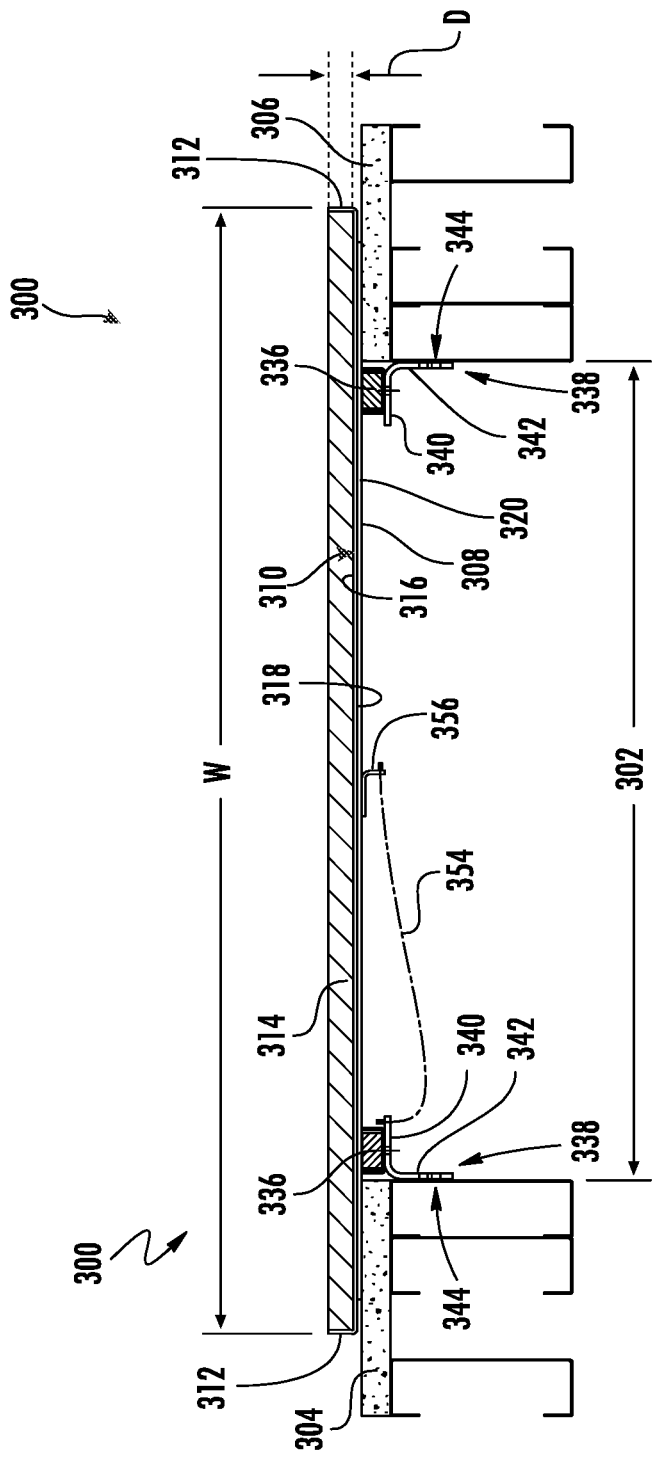
FIG. 4 depicts a cross section of a third exemplary embodiment of an expansion joint.

With reference now to FIG. 4, still another embodiment of an expansion joint 300 is provided. In the embodiment depicted in FIG. 4, the expansion joint 300 covers a gap 302 between a first wall section 304 and a second wall section 306. A cross section of the expansion joint 300 is depicted in FIG. 4, which illustrates the width component of the expansion joint 300 that covers the width of the gap 302 between architectural surfaces and which illustrates the attachment of the expansion joint 300 to the architectural surfaces. Similarly to the expansion joint 100 of FIG. 1 and the expansion joint 200 of FIG. 3, Applicant notes that there is a length component to the expansion joint 300 of FIG. 4 that spans all or a substantial portion of the length of the gap 302, especially a substantial portion of the gap 302 that is visible to an occupant of the building.

As shown in FIG. 4, the expansion joint 300 includes a panel 307 depicted as a cover pan 308 having a planar bottom section 310 and two side sections 312 arranged perpendicularly to the bottom section 310. The bottom section 310 and side sections 312 define a volume within the cover pan 308. Further, the side sections 312 define a depth D of the cover pan 308, which in embodiments is from 5 mm to 100 mm, from 10 mm to 50 mm, or from 15 mm to 25 mm. Disposed within the depth D of the cover pan 308 is pan infill 314. As with the pan infill 114 of the expansion joint 100 of FIG. 1 and/or of the expansion joint 200 of FIG. 3, the pan infill 314 may be a decorative feature to match the interior design of the building in which the expansion joint 300 is installed. That is, the pan infill 314 may be paneling matching the pattern, color, and/or texture of the paneling on the wall sections 304, 306. The pan infill 314 can be attached to or formed in the cover pan 308 in a variety of suitable ways, such as adhesives (e.g., tape), bonding agents (e.g., glues or epoxies), hook and loop fastener, painting, particle deposition (e.g., powder coating), etc. As described above, the panel 307 in embodiments may instead be a composite of various face materials, core materials, and/or backing materials. Further, in embodiments, the panel 307 may be a single integral piece, instead of multiple pieces (e.g., cover pan 308 and pan infill 314) joined together.

The bottom section 310 of the cover pan 308 has a first surface 316 upon which the pan infill 314 is disposed and a second surface 318 that is opposite to the first surface 316. In embodiments, a magnetic strike plate 320 is disposed on the second surface 318. The magnetic strike plate 320 can be joined to the second surface 318 of the cover pan 308 in a variety of ways, including welding (e.g., spot welding), bonding with an adhesive, fasteners (e.g., screws, rivets, pins, etc.), or mechanical interfaces (such as sliding the magnetic strike plate 320 into a slot formed on or into the second surface 318), among others. As will discussed more fully below, the magnetic strike plate 320 allows for the cover pan 308 to remain in place over the gap 302 while still allowing the cover pan 308 to slide along both the first wall section 304 and the second wall section 306 during expansion and contraction of the gap 302. In certain embodiments, a separate magnetic strike plate 320 is not provided, and instead, the second surface 318 of the cover pan 308 is able to be attracted by a magnet and, thus, acts as a magnetic strike plate. Further, in embodiments, the strike plate 320 is not continuous across the width of the panel 307. For example, in embodiments, the strike plate 320 comprises two plates with standard set widths of 50% or less than the width of the panel 307. Further, in embodiments, the strike plates 320 are not symmetrically arranged. For example, the strike plates 320 may have variable spacing along the second surface 318 of the panel 307, and in embodiments in which the strike plates 320 are not continuous across the width of the panel 307, the strike plates 320 on either side of the panel 307 may be vertically offset from each other.

The magnetic strike plate 320 of the cover pan 308 is magnetically attracted to at least one magnetic assembly, depicted as magnetic blocks 336, contained on brackets 338. In the particular embodiment depicted, each wall section 304, 306 includes a bracket 338 having at least one magnetic block 336 disposed thereon. More particularly, each bracket 338 has a first bracket portion 340 to which the magnetic blocks 336 are mounted and a second bracket portion 342 that is arranged perpendicularly to the first bracket portion 340. The second bracket portion 342 is connected to a respective wall section 304, 306 via a plurality of fasteners 344. The magnetic blocks 336 may be attached to the first bracket portion 340 of each bracket 338 using fasteners, adhesives or bonding agents, or by relying on magnetic attraction between the magnetic assembly and the first bracket portion 340 (if made of a magnetic material). One or both brackets 338 may be a continuous bracket spanning the length of the cover pan 308, or one or both brackets 338 may be a plurality of brackets that span the length of the cover pan 308 at regular or irregular intervals.

In embodiments, each of the magnetic structures has a magnetic flux density of at least 0.5 kG, at least 1.0 kG, or at least 1.5 kG. Alternatively or additionally, in embodiments, each of the magnetic structures is configured to hold at least 10 lbs, at least 60 lbs, or at least 90 lbs. Exemplary magnet materials that may be used for the magnetic structures include ferrite magnets, rare earth magnets, ceramic magnets, and/or alnico magnets.

As described, the third embodiment of the expansion joint 300 floats over both the first wall section 304 and the second wall section 306. More particularly, the magnetic strike plate 320 is attracted to the magnetic blocks 336 of each bracket 338 to maintain the cover pan 308 over the respective wall sections 304, 306. In this way, as the gap 302 expands and contracts from, e.g., thermal fluctuations or seismic activity, the cover pan 308 will continue to conceal the gap 302. In some instances, the thermal expansion or seismic activity may be so great as to overcome the magnetic attraction between the magnetic strips 336 and the magnetic strike plate 320 such that the cover pan 308 becomes dislodged. In such instances, the third embodiment of the expansion joint 300 includes at least one tether 354 connecting the cover pan 308 to either or both wall sections 304, 306.

As shown in FIG. 3, the tether 354 is provided between the bracket 338 connected to the first wall section 304 and a cover pan bracket 356 disposed on the magnetic strike plate 320. The cover pan bracket 356 can be joined to the magnetic strike plate 320 or second surface 318 in a variety of ways, including welding (e.g., spot welding), bonding with an adhesive, fasteners (e.g., screws, rivets, pins, etc.), or mechanical interfaces (such as sliding the cover pan bracket 356 into a slot formed on or into the magnetic strike plate 320 or second surface 318), among others. In general, the cover pan bracket 356 is centrally located on the magnetic strike plate 320; however, the exact placement of the cover pan bracket 356 can vary so long as the cover pan bracket 356 remains disposed within the gap 302 during installation. Further, while only a single tether 354 connecting the cover pan bracket 356 to the bracket 338 of the first wall section 304 is depicted, in other embodiments, a tether 354 may extend from the bracket of each wall section 304, 306 to the cover pan bracket. As in the previous embodiments, the tether 354 may be, e.g., a coated or uncoated metal cable, cord made from natural or synthetic yarns, chain-link cable, wire, etc. The length of the tether 354 may depend on, e.g., the width of the gap 302, and in embodiments, the tether 354 has a length of from 100 mm to 1000 mm. Further, in embodiments, a plurality of tethers 354 is placed along the length of the cover pan 308 at regular or irregular intervals. In embodiments having multiple tethers 354, the tether 354 may extend from either the bracket 338 of the first wall section 304 or the bracket 338 of the second wall section 306 in a periodically or non-periodically alternating fashion.

In embodiments, the gap 302 between the wall sections 304, 306 is from 75 mm to 300 mm and a width W of the cover pan 308 is from 275 mm to 500 mm. In other embodiments, the gap 302 between the wall sections 304, 306 is from 250 mm to 850 mm and the width W of the cover pan 308 is from 450 mm to 1050 mm. In still other embodiments, the gap 302 between the wall sections 304, 306 is from 800 mm to 1500 mm and the width W of the cover pan 308 is from 1000 mm to 1700 mm. In any of the previous embodiments, the cover pan 308 may be configured to cover the gap 302 as it expands and contracts from, e.g., 25% to 100% of the gap 302. In order to maintain the magnetic strike plate 320 in contact with the magnetic strips 336 of each wall section 304, 306, in embodiments, the magnetic strike plate 320 has a width that is at least 110% of the width of the gap 302. In other embodiments, the magnetic strike plate 320 has a width that is at least 120% of the width of the gap 302. In still further embodiments, the magnetic strike plate 320 has a width that is at least 130% of the width of the gap 302. In embodiments, the magnetic strike plate 320 has a width that is no more than the width of the cover pan 308. In embodiments, the magnetic strike plate 320 is continuous along the length of the cover pan 308, and in other embodiments, the magnetic strike plate 320 comprises a plurality of strike plates 320 spanning the length of the cover pan 308 at regular or irregular intervals.

The expansion joint 300 as described with respect to FIG. 3 is configured to cover a gap 302 between architectural surfaces for both aesthetic and safety reasons. Using magnetic attraction between the magnetic strike plate 320 and the magnetic strips 336 of each wall section 304, 306 allows the cover pan 308 of the expansion joint 300 to float over one architectural surface while the tether 350 or tethers 350 prevent the cover pan 308 from becoming completely dislodged. Additionally, using magnetic attraction also allows for easier uncovering of the gap 302 so that, e.g., maintenance personnel can access the space between the architectural surfaces to install or check the status of any fire barriers, water barriers, etc. contained therein.

Figure 5:
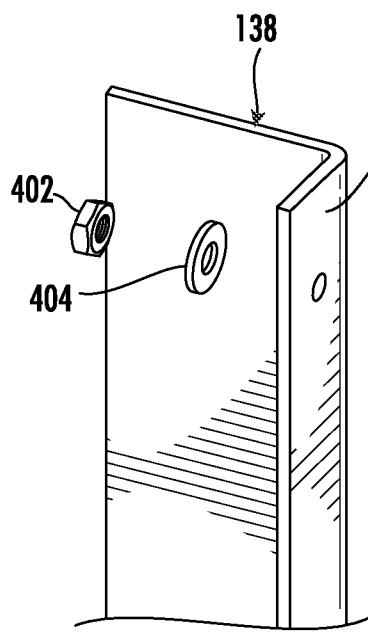
FIG. 5 depicts an exploded perspective view of a magnetic assembly, according to another exemplary embodiment.

Referring to FIGS. 5-26, various views are shown of magnetic assemblies that utilize a cylindrical magnetic structure 400 and various components thereof. The magnetic assemblies shown in FIGS. 5-26 are similar and serve a similar function to the magnetic blocks 136 described above. However, the specific embodiments shown in FIGS. 5-26 include magnetic assemblies that specifically allow the magnetic structure 400 to move and/or tilt in response to movement of cover pan 108 when magnetic structure 400 is magnetically secured to cover pan 108. An assembly that allows magnetic structure 400 to move in response to movement of cover pan 108 increases the reliability of the connection between magnetic structure 400 and magnetic strike plate 120 of cover pan 108, which in turn decreases the chances of cover pan 108 becoming dislodged from magnetic structure 400. As such, magnetic assemblies that allow movement of magnetic structure 400, increase the ability of the magnetic structure to accommodate movement and maintain contact with cover pan 108 during settlement of the building structure, or wall construction variances Referring to FIGS. 5-26, various views are shown of magnetic assemblies that include magnetic structures capable of movement, such as tilting, and of various components thereof. As shown in FIG. 5, magnetic structure 400 includes a cluster of magnets 401, specifically 6 magnets. In other embodiments, the magnetic structure 400 may be a single magnet or may include a cluster of more or fewer than 6 magnets. As shown in FIG. 5, magnetic structure 400 is generally cylindrical in shape.

Figure 6:
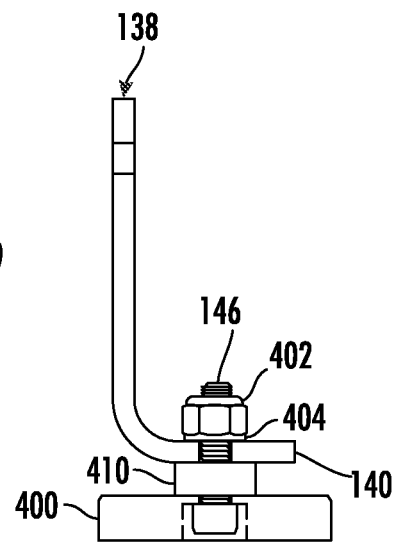
FIG. 6 depicts a bottom view of the magnetic assembly shown in FIG. 5, according to an exemplary embodiment.
Figure 7:
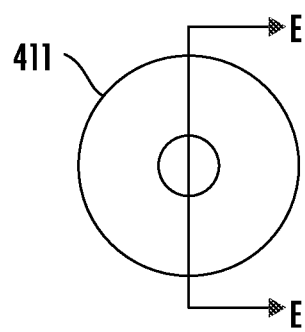
FIG. 7 depicts a front view of a resilient structure, according to another exemplary embodiment.
Figure 8:
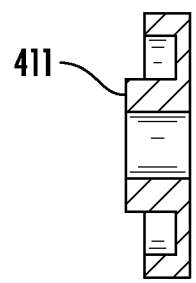
FIG. 8 depicts a cross-section of the resilient structure shown in FIG. 7, taken along line E-E, according to an exemplary embodiment.
Figure 9:
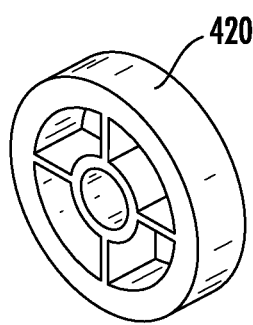
FIG. 9 depicts a perspective view of a resilient structure, according to another exemplary embodiment.
Figure 10:
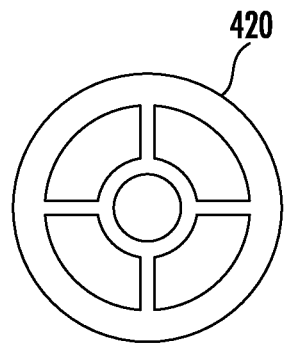
FIG. 10 depicts a front view of the resilient structure shown in FIG. 9, according to an exemplary embodiment.
Figure 11:
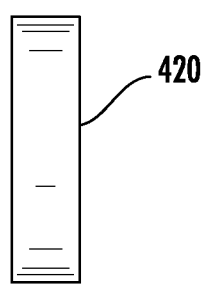
FIG. 11 depicts a side view of the resilient structure shown in FIG. 9, according to an exemplary embodiment.
Figure 12:
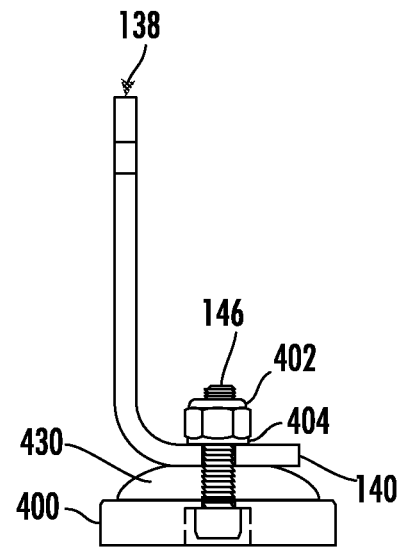
FIG. 12 depicts a bottom view of a magnetic assembly, according to another exemplary embodiment.
Figure 13:
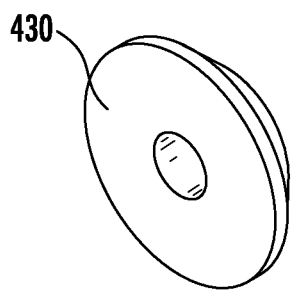
FIG. 13 depicts a perspective view of the resilient structure of the magnetic assembly shown in FIG. 12, according to an exemplary embodiment.
Figure 14:
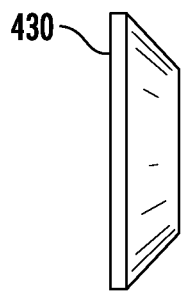
FIG. 14 depicts a side view of the resilient structure shown in FIG. 13, according to an exemplary embodiment.
Figure 15:
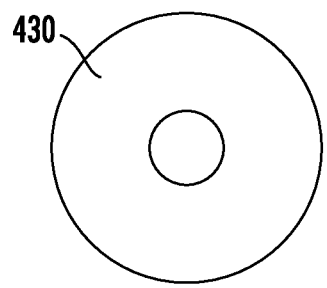
FIG. 15 depicts a front view of the resilient structure shown in FIG. 13, according to an exemplary embodiment.

Referring to FIGS. 5-6, a resilient structure, shown as gasket 410, is positioned between magnetic structure 400 and an exterior surface of first bracket portion 140. In specific embodiments, when cover pan 108 moves, in response to shifting of the first architectural surface and the second architectural surface with respect to each other, the resilient structure is configured to at least in part to move or deform in a manner that allows movement of magnetic structure 400 in response to the movement of cover pan 108 without detaching from cover pan 108. A fastener 146 passes through magnetic structure 400, gasket 410, and an opening defined in first bracket portion 140 and interacts with a washer 404 and a nut 402 to couple magnetic structure 400, gasket 410, and first bracket portion 140 together. As shown in FIGS. 5-6, gasket 410 is a simple gasket. FIGS. 7-8 illustrate an alternate form of resilient structure, shown as gasket 411, which includes opposing surfaces of different sizes, the smaller of the opposing surfaces configured to first bracket portion 140, such as to increase the range of tilting motion of magnetic structure 400 with respect to first bracket portion 140. As shown in FIGS. 5-8, gaskets 410 and 411 are comprised of rubber, and the surfaces of gasket 410 that respectively interact with magnetic structure 400 and first bracket portion 140 are generally circular. However, in other specific embodiments other resilient materials, such as resilient foam, and/or other resilient structures, such as metal spring structures (e.g. coil or leaf spring structures), may be utilized to allow magnetic structure 400 to tilt in response to movement of cover pan 108. FIGS. 9-11 show another embodiment of a gasket, shown as gasket 420, that could be positioned between magnetic structure 400 and first bracket portion 140. Gasket 420 comprises an open-cell framework to further promote the resiliency of gasket 420. Further, FIGS. 12-15 show various views of yet another embodiment of a gasket, shown as domed gasket 430. As shown in FIG. 12, when positioned between magnetic structure 400 and first bracket portion 140 of bracket 138, the dome of domed gasket 430 faces first bracket portion 140, further promoting the readiness of magnetic structure 400 to tilt with respect to first bracket portion 140.

Figure 16:
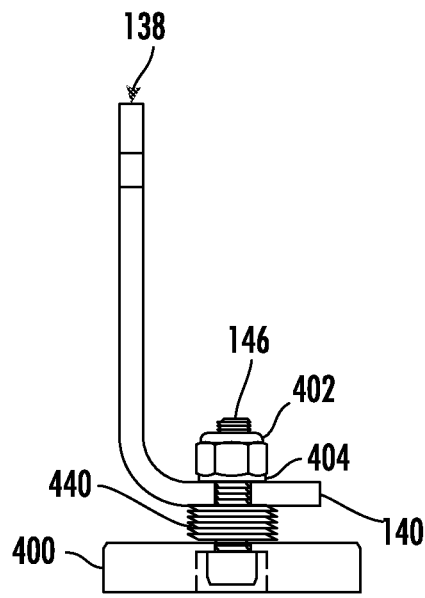
FIG. 16 depicts a bottom view of a magnetic assembly, according to another exemplary embodiment.
Figure 17:
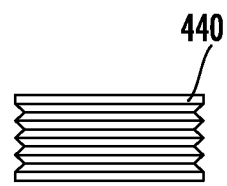
FIG. 17 depicts a bottom view of the resilient structure of the magnetic assembly shown in FIG. 16 in a compressed state, according to an exemplary embodiment.
Figure 18:
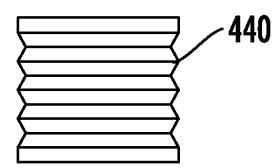
FIG. 18 depicts a bottom view of the resilient structure shown in FIG. 17 in an expanded state, according to an exemplary embodiment.
Figure 19:
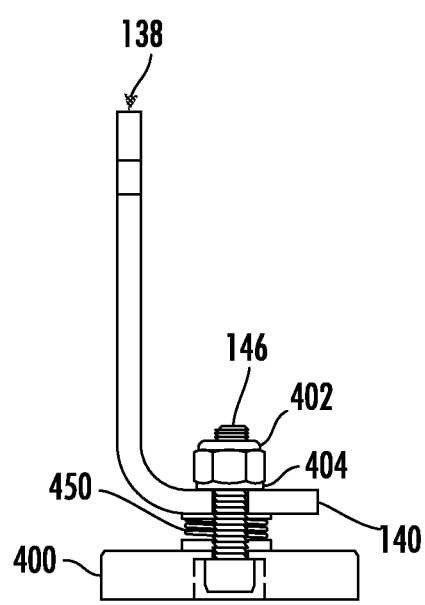
FIG. 19 depicts a bottom view of a magnetic assembly, according to another exemplary embodiment.
Figure 20:
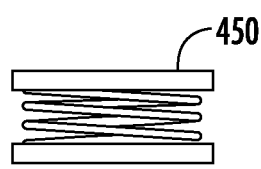
FIG. 20 depicts a bottom view of a resilient structure of the magnetic assembly shown in FIG. 19 in a compressed state, according to an exemplary embodiment.
Figure 21:
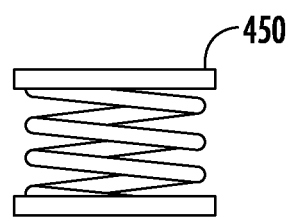
FIG. 21 depicts a bottom view of the resilient structure shown in FIG. 20 in an expanded state, according to an exemplary embodiment.
Figure 22:
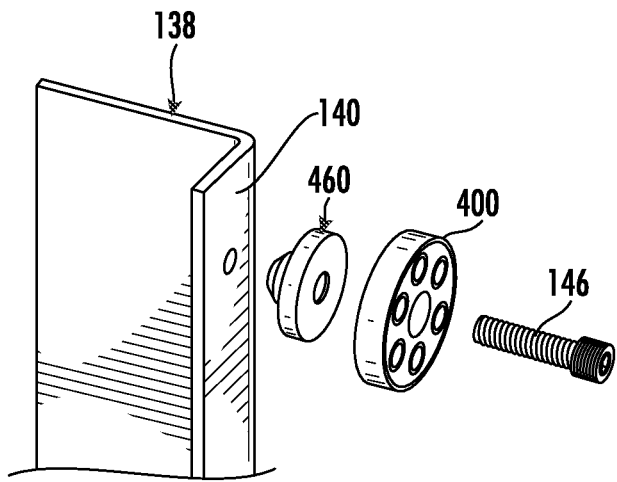
FIG. 22 depicts an exploded perspective view of a magnetic assembly, according to another exemplary embodiment.
Figure 23:
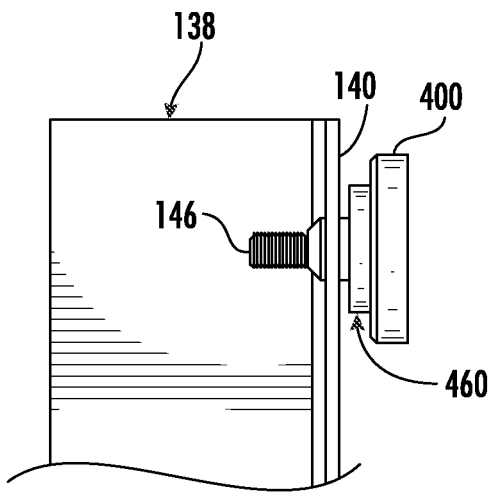
FIG. 23 depicts a side view of the magnetic assembly shown in FIG. 22, according to an exemplary embodiment.
Figure 24:
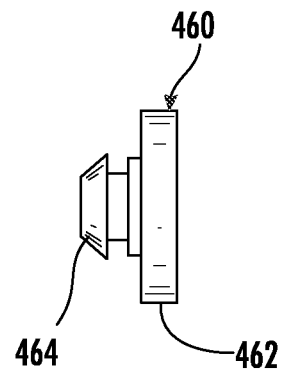
FIG. 24 depicts a side view of a resilient structure of the magnetic assembly shown in FIG. 23, according to an exemplary embodiment.
Figure 25:
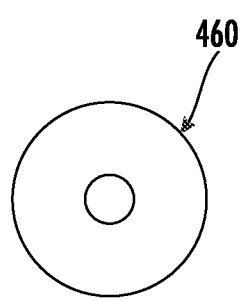
FIG. 25 depicts a front view of the resilient structure shown in FIG. 24, according to an exemplary embodiment.
Figure 26:
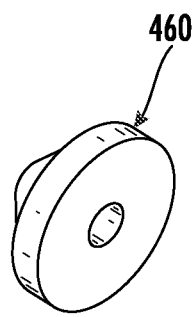
FIG. 26 depicts a perspective view of the resilient structure shown in FIG. 24, according to an exemplary embodiment.

Referring to FIGS. 16-21, alternate forms of resilient structures are depicted. In FIGS. 16-18, the resilient structure is shown as a compression gasket 440. As shown in FIGS. 16-18, compression gasket 440 is comprised of rubber. When magnetic structure 400 tilts or otherwise moves in response to movement of cover pan 108, compression gasket 440 may expand, compress, or in part expand and in part compress to accommodate the movement of magnetic structure 400 with respect to first bracket portion 140. In FIGS. 19-21, the resilient structure is shown as a spring 450. As shown in FIGS. 19-21, spring 450 is comprised of metal coils. When magnetic structure 400 tolts or otherwise moves in response to movement of cover pan 108, spring 450 may expand, compress, or in part expand and in part compress to accommodate the movement of magnetic structure 400 with respect to first bracket portion 140.

Referring to FIGS. 22-26, various views a magnetic assembly that includes a press-in gasket 460 are shown. As shown in FIGS. 22-26 press-in gasket 460 is comprised of rubber and includes a threaded insert to receive and secure fastener 146. In specific embodiments, press-in gasket 460 includes a base portion 462 and a press-in portion 464. After assembly, base portion 462 is positioned between magnetic structure 400 and bracket portion 140, and press-in portion 464 is positioned on an opposite side of bracket portion 140 from base portion 462. Base portion 462 operates similarly to gasket 410. However, use of press-in gasket 460 decreases the number of small parts required for assembly of the expansion joint cover, eliminating the need for nuts and washers.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An expansion joint configured to span a gap having a width between a first architectural surface and a second architectural surface, comprising:
   a panel sized to span the gap, the panel having a first surface and a second surface, the second surface being opposite the first surface;
   a first bracket configured to couple to the first architectural surface and to the second surface of the panel;
   a second bracket configured to couple to the second architectural surface and to the second surface of the panel; and
   a first magnetic assembly comprising:

first magnetic structure coupled to the first bracket and magnetically coupled to the second surface of the panel, and a first resilient structure positioned at least in part between the first magnetic structure and the first bracket such that the first resilient structure allows movement of the first magnetic structure in response to movement of the panel caused by a change in the width between the first architectural surface and the second architectural surface when the first bracket is coupled to the first architectural surface and the second bracket is coupled to the second architectural surface;

wherein the first resilient structure is comprised of rubber;
wherein the first resilient structure comprises a gasket;
wherein the gasket comprises an open-cell framework.

2. An expansion joint configured to span a gap having a width between a first architectural surface and a second architectural surface, comprising:

a panel sized to span the gap, the panel having a first surface and a second surface, the second surface being opposite the first surface;

a first bracket configured to couple to the first architectural surface and to the second surface of the panel;

a second bracket configured to couple to the second architectural surface and to the second surface of the panel; and a first magnetic assembly comprising:
first magnetic structure coupled to the first bracket and magnetically coupled to the second surface of the panel, and a first resilient structure positioned at least in part between the first magnetic structure and the first bracket such that the first resilient structure allows movement of the first magnetic structure in response to movement of the panel caused by a change in the width between the first architectural surface and the second architectural surface when the first bracket is coupled to the first architectural surface and the second bracket is coupled to the second architectural surface;

wherein the first resilient structure is comprised of rubber;
wherein the first resilient structure comprises a gasket;
wherein the gasket is a domed gasket comprising a domed surface.

3. The expansion joint of claim 2, wherein the first resilient structure is positioned such that the domed surface faces the first bracket.

4. An expansion joint configured to span a gap having a width between a first architectural surface and a second architectural surface, comprising:

a panel sized to span the gap, the panel having a first surface and a second surface, the second surface being opposite the first surface;

a first bracket configured to couple to the first architectural surface and to the second surface of the panel;

a second bracket configured to couple to the second architectural surface and to the second surface of the panel; and a first magnetic assembly comprising:
first magnetic structure coupled to the first bracket and magnetically coupled to the second surface of the panel, and a first resilient structure positioned at least in part between the first magnetic structure and the first bracket such that the first resilient structure allows movement of the first magnetic structure in response to movement of the panel caused by a change in the width between the first architectural surface and the second architectural surface when the first bracket is coupled to the first architectural surface and the second bracket is coupled to the second architectural surface;

wherein the first resilient structure is comprised of rubber;
wherein the first resilient structure comprises a gasket;
wherein the gasket is a compression gasket.

5. An expansion joint configured to span a gap having a width between a first architectural surface and a second architectural surface, comprising:

a panel sized to span the gap, the panel having a first surface and a second surface, the second surface being opposite the first surface;

a first bracket configured to couple to the first architectural surface and to the second surface of the panel;

a second bracket configured to couple to the second architectural surface and to the second surface of the panel; and a first magnetic assembly comprising:
first magnetic structure coupled to the first bracket and magnetically coupled to the second surface of the panel, and a first resilient structure positioned at least in part between the first magnetic structure and the first bracket such that the first resilient structure allows movement of the first magnetic structure in response to movement of the panel caused by a change in the width between the first architectural surface and the second architectural surface when the first bracket is coupled to the first architectural surface and the second bracket is coupled to the second architectural surface;

wherein the first resilient structure is comprised of rubber;
wherein the first resilient structure comprises a gasket;
wherein the gasket is a press-in gasket that couples to the first bracket.

6. An expansion joint configured to span a gap having a width between a first architectural surface and a second architectural surface, comprising:

a panel sized to span the gap, the panel having a first surface and a second surface, the second surface being opposite the first surface;

a first bracket configured to couple to the first architectural surface and to the second surface of the panel;

a second bracket configured to couple to the second architectural surface and to the second surface of the panel; and a first magnetic assembly comprising:
first magnetic structure coupled to the first bracket and magnetically coupled to the second surface of the panel, and a first resilient structure positioned at least in part between the first magnetic structure and the first bracket such that the first resilient structure allows movement of the first magnetic structure in response to movement of the panel caused by a change in the width between the first architectural surface and the second architectural surface when the first bracket is coupled to the first architectural surface and the second bracket is coupled to the second architectural surface;

wherein the first resilient structure comprises a metal coil.

7. An expansion joint configured to span a gap having a width between a first architectural surface and a second architectural surface, comprising:

a panel sized to span the gap, the panel having a first surface and a second surface, the second surface being opposite the first surface and coupled to the first architectural surface and to the second architectural surface;
a magnetic strike plate coupled to the second surface of the panel;
a first bracket having a first bracket portion and a second bracket portion, the second bracket portion configured to couple to the first architectural surface;
a first resilient structure coupled to the first bracket portion; and
a first magnetic structure coupled to the first resilient structure;
wherein the first magnetic structure is magnetically coupled to the magnetic strike plate; and
wherein movement of the panel causes movement of the first magnetic structure that deforms at least a portion of the first resilient structure;
wherein the first resilient structure comprises a spring.

8. The expansion joint of claim 7, wherein the first resilient structure is comprised of rubber.

9. The expansion joint of claim 7, wherein the first resilient structure comprises a gasket.

10. The expansion joint of claim 7, further comprising a second bracket having a third bracket portion and a fourth bracket portion, the fourth bracket portion configured to couple to the second architectural surface; a second resilient structure coupled to the second bracket portion; and a second magnetic structure coupled to the second resilient structure; wherein the second magnetic structure is magnetically coupled to the magnetic strike plate; and wherein movement of the panel causes movement of the second magnetic structure that deforms at least a portion of the second resilient structure.

11. An expansion joint configured to span a gap having a width between a first architectural surface and a second architectural surface, comprising:
a panel having a first end and a second end defining a planar section therebetween, the planar section having a first surface and a second surface, the second surface being opposite the first surface;
a magnetic strike plate coupled to the second surface of the planar section;
a first bracket having a first bracket portion and a second bracket portion perpendicular to the first bracket portion, the second bracket portion configured to couple to the first architectural surface;
a second bracket having a third bracket portion and a fourth bracket portion perpendicular to the third bracket portion, the fourth bracket portion configured to couple to the second architectural surface;
a first magnetic assembly comprising:
a first magnetic structure magnetically coupled to the magnetic strike plate, the first magnetic structure having a generally cylindrical shape and including a first plurality of magnets;
a first rubber gasket positioned at least in part between the first magnetic structure and the first bracket portion, and
a first fastener that couples the first magnetic structure, the first rubber gasket, and the first bracket portion together; and
a second magnetic assembly comprising:
a second magnetic structure magnetically coupled to the magnetic strike plate, the second magnetic structure having a generally cylindrical shape and including a second plurality of magnets,
a second rubber gasket positioned at least in part between the second magnetic structure and the third bracket portion, and
a second fastener that couples the second magnetic structure, the second rubber gasket, and the third bracket portion together;
wherein when the panel moves in response to a change in the width between the first architectural surface and the second architectural surface, the first rubber gasket allows the first magnetic structure to tilt in response to the movement of the panel without decoupling from the magnetic strike plate and the second rubber gasket allows the second magnetic structure to tilt in response to the movement of the panel without decoupling from the magnetic strike plate;
wherein the first rubber gasket comprises a base portion and a press-in portion coupled to the base portion, wherein the press-in portion and the base portion are positioned on opposite sides of the first bracket portion, wherein the first fastener is a threaded fastener, and wherein the first rubber gasket further comprises a threaded insert to receive the first fastener.

* * * * *